April 12, 1949.　　　G. A. BRONSON　　　2,466,980
MISSILE EJECTOR FOR AIRCRAFT

Filed June 2, 1947　　　　　　　　　　　　3 Sheets-Sheet 1

INVENTOR.
GEORGE A. BRONSON
BY J Edwin Coates
ATTORNEY

April 12, 1949. G. A. BRONSON 2,466,980
MISSILE EJECTOR FOR AIRCRAFT
Filed June 2, 1947 3 Sheets-Sheet 2

INVENTOR.
GEORGE A. BRONSON
BY
Edwin Coates
ATTORNEY

April 12, 1949. G. A. BRONSON 2,466,980
MISSILE EJECTOR FOR AIRCRAFT
Filed June 2, 1947 3 Sheets-Sheet 3
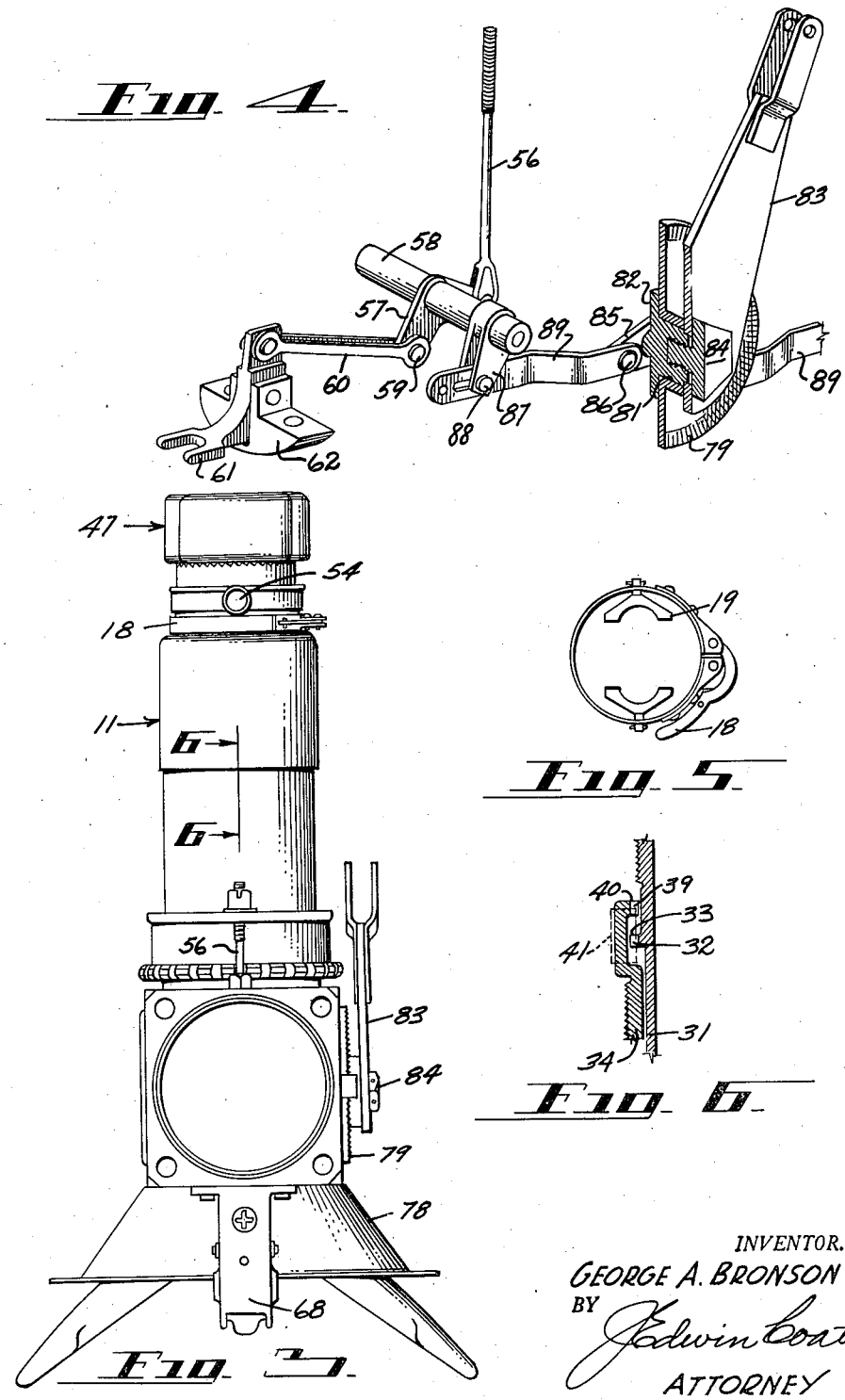

UNITED STATES PATENT OFFICE 2,466,980

MISSILE EJECTOR FOR AIRCRAFT

George A. Bronson, Santa Monica, Calif., assignor to Douglas Aircraft Company, Inc., Santa Monica, Calif.

Application June 2, 1947, Serial No. 751,717

12 Claims. (Cl. 89—1.5)

This invention relates to bombing gear, and particularly to those employed in dive bombers for carrying bombs and displacing them outwardly sufficiently to enable them to clear the airplane propeller disk when they drop.

Most such devices, including the conventional framed cradle swingable arcuately outwardly from its retracted position against the fuselage exterior to a position displacing the bomb beyond the propeller disk, are excessively heavy and bulky and unduly increase the load of the airplane and either occupy valuable interior space or protrude into the airstream and materially augment the drag.

The present invention provides a combined bomb carrying rack and explosive-actuated bomb displacing gear which, when triggered, automatically first releases the bomb and then forcibly ejects it laterally outwardly from the diving airplane to a position beyond the propeller disk, whereafter the bomb commences its descent. The device is compactly constructed of a relatively small number of light parts, weighing about one third as much as the previous bomb displacers of the same capacity, and hence itself adds no appreciable load to the airplane. It can be carried in a relatively small space in the fuselage with only the relatively small bomb-lug engaging hooks and a streamlined foot protruding. So disposed, it is substantially completely protected from the detrimental effects of landing field dust and mud, from ice accretion and from moisture corrosion. It is so constructed, however, that if foreign matter should enter the mechanism it cannot render any part of the ejector inoperative. The invention also includes manually operable means effective to release the bomb in the event that through damage to the automatic ejecting means, same becomes inoperative.

In one of the now preferred embodiments of the invention, the construction essentially comprises a relatively short tubular bomb supporting member carrying the bomb on its lower periphery and mounted in longitudinally extending attitude just inside the fuselage skin near the center of gravity of the airplane. The bomb supporting tube bears two longitudinally spaced pairs of bomb-lug engaging hooks adapted to support the bomb in fore-and-aft attitude underneath the fuselage skin, the bomb lying outside of and parallel to the lower surface of the tube. The bomb-supporting tube supports a shorter multitubular, explosive type, bomb ejecting assembly rising upwardly in the fuselage rectangularly of the medial portion of the bomb carrier tube.

The aforesaid explosive bomb ejecting assembly essentially comprises four vertically disposed cylinders concentrically arranged and supported at their lower ends for differential reciprocation by an abbreviated tubular member rising above the upper surface of the bomb-carrying tube from the medial portion thereof. The innermost cylinder is upwardly movably mounted in the tubular assembly, is closed at its upper end and open at its lower end and contains a downwardly and upwardly acting explosive charge at its upper end. It is directly connected at that end to the outermost cylinder, thus in effect providing a double-wall cylinder, the inner wall and upper closure of which define an explosive-type ejection motivating member. The outer wall of the double-cylinder is provided, at its lower periphery, with an annular shoulder, to diametrically opposite points of which are anchored the upper ends of a pair of bomb hook operating linkages which extend laterally in the bomb-supporting tube to each side of the vertical center-line of the device. The lower outer end of each longitudinally extending linkage is leveredly connected to vertically acting bomb hook releasing means located at each pair of hooks. The cylinder member disposed immediately outside the innermost cylinder member is initially downwardly reciprocatable and terminates downwardly as a bifurcated foot peripherally straddling the upper medial portion of the bomb. The upper end of this cylinder is spring abutted against the lower end of the innermost cylinder so as to effectuate automatic return of the bomb foot carrying cylinder to the retracted position, suitable residual-gas exhaust porting being provided in the wall of this cylinder and functioning to exhaust to atmosphere when the lower end of the central cylinder is downwardly passed by said port. A detent stop carrying cylinder is concentrically disposed intermediate the foot-carrying cylinder and the outermost cylinder, which in turn carries detent means adapted to engage the stop and thereby limit upward movement of the outermost cylinder, the stop-carrying cylinder also bearing radially inwardly movable keys adapted to engage with the detent carrying cylinder to prevent relative rotation thereof.

When the charge is fired, the innermost cylinder, being closed at its top and open at its bottom, takes the upward reaction of the downwardly and upwardly acting explosion and is thereby urged upwardly until it is halted by the detent stop carried by the aforesaid intermediate cylinder. The bomb release linkages, anchored at their upper ends to the lower end of the outermost cylinder, are thereby actuated to open the bomb hooks and release the bomb from the longitudinally extending rack. Immediately thereafter, the foot-carrying cylinder is released by the aforesaid unbalancing of the initially balanced gaseous forces and the bomb now being unshackled, is suddenly urged downwardly by the downward component of the expanding gases, thus forcibly ejecting the bomb laterally outwardly from the diving airplane to a position beyond its propeller disk.

The aforementioned embodiment is illustrated in the accompanying drawings and described in detail hereinafter in conjunction therewith. It is to be understood, however, that the invention is by no means limited, as to the constructional forms which it may assume, to the details shown or described, being in fact and in law capable of incorporation in any physical form lying within the scope of the annexed claims.

In these drawings:

Figure 3 is an end elevation of the device;

Figure 4 is a perspective detail of the hook-operating linkage, also showing the manually operable emergency release mechanism;

Figure 5 is a top plan view of a toggle type clamp which holds the parts in assembled relation; and Figure 6 is a detail vertical section taken on line 6—6 of Figure 3.

Figure 1:
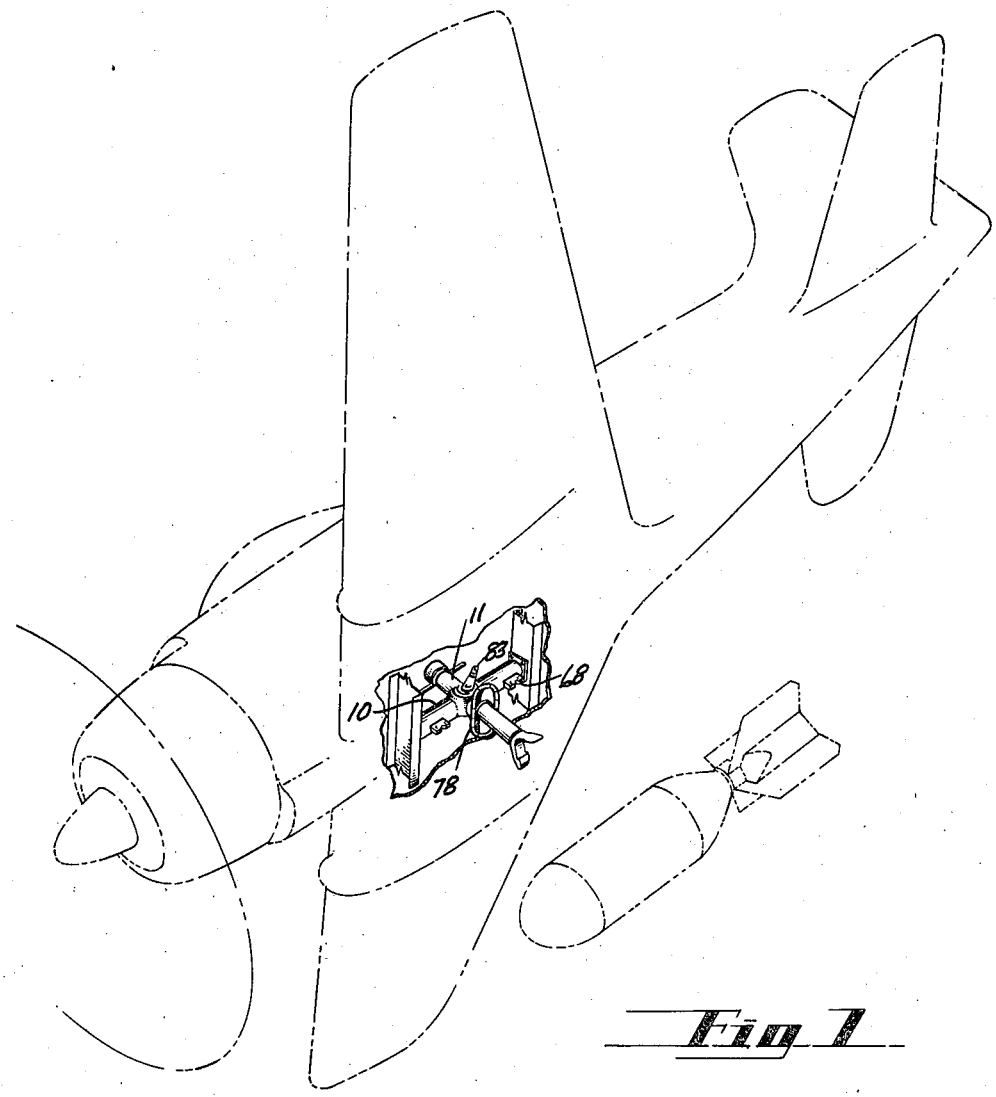
Figure 1 is a fragmentary perspective view of a dive bomber showing the combined bomb rack and ejector mounted therein and carrying a bomb.

The gear illustrated comprises a relatively short tubular bomb carrying member 10 disposed in a fore-and-aft attitude inwardly adjacent the fuselage lower skin near the center of gravity of the airplane. A shorter-multi-tubular, explosive type, bomb releasing and ejecting assembly 11 extends vertically upwardly from the lower surface of the housing 10 at its median portion.

The assembly 11 contains the motivating means for operating both the bomb releasing mechanism and the bomb thrusting mechanism and comprises a short supporting tube 12 attached by its lower annular flanged end to the underside of a vertical opening in the medial portion of the tube 10. The upper end of tube 12 is interiorly threaded as at 13, and intermediate its ends its interior surface bears an annular packing 14. A tubular member 15 having a ring-sealed, open-center, lower end 16 and including an annular groove 17 at its upper end for receiving an over-center clamp 18 carrying a pair of oppositely disposed arcuate locking keys 19 is reciprocatably mounted concentrically inwardly of tube 12, being disposed coaxially of the center line of the device. A helically coiled return spring 20 is peripherally mounted on the exterior of the piston cylinder, being interposed between the aforesaid abutment and an abutment constituting the lower end of the cylinder 15. Concentrically inwardly of the tubular member 15, and seated by an annular flange at its upper end on the upper end of the member 15, is an explosive supporting chamber 21 perforated at its lower conical end with exhaust apertures 22. Chamber 21 is adapted for receiving an explosive charge, such as an engine starter cartridge, disposed therein with its rim properly seated on the upper interior edge of the chamber.

A multi-wall, vertically and radially sectional tubular assembly 23 is disposed concentrically outwardly of the tubular member 15, being connected at its upper end to the upper end of the tubular member 15 by means of the locking keys 19. The tubular assembly comprises two vertically arranged overlapping portions 24 and 25, the upper end of the upper portion 24 terminating near the groove 17, and the lower member 25 terminating in an inwardly concave annular shoulder 26, containing a buffer unit 26a. The tubular members overlap against an O-ring or other seal 27.

Concentrically inwardly of the bipartite wall 24—25 is disposed a downwardly extending tubular sleeve 28, bearing at its upper end an inwardly concave annulus 29, registering with the groove 17 and disengageably united to tubular member 15 by means of the clamp and keys. The outer periphery of the upper portion of sleeve 28 is screw threaded to reach on corresponding threads 30 on the inner periphery of the upper end of member 25, and the lower end of sleeve 28 angles inwardly as a depending skirt 31. Medially of the skirt its outer periphery bears an annular exterior shoulder formed with a series of radially extending notches circumferentially dividing the annulus into a plurality of lugs or detents 33.

Figure 2:
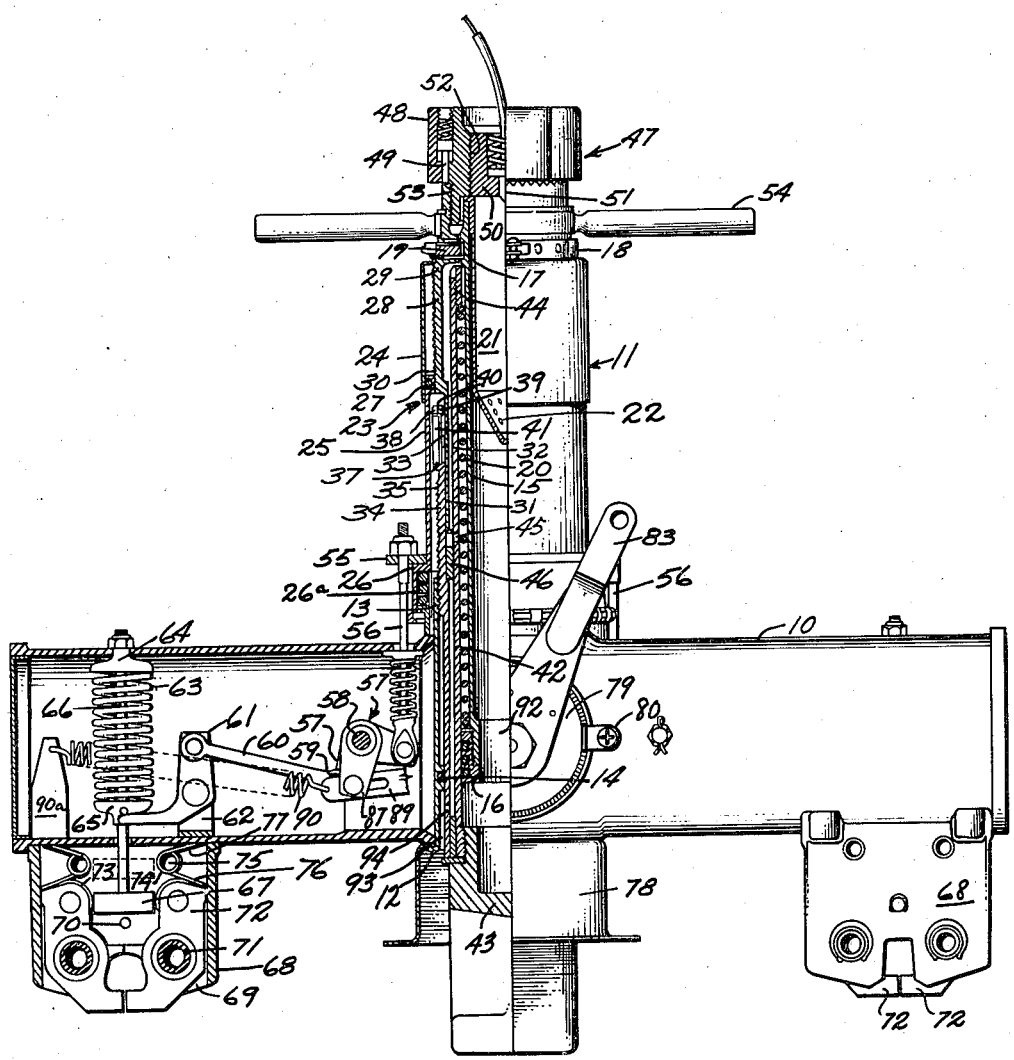
Figure 2 is a view showing the device half in elevation and half in vertical section.

In order to permit relative upward movement of the tubular assembly 23—29 to an extent sufficient to provide momentum adequate to overcome the initial inertia of the bomb releasing mechanism, hereinafter described, that is, to actuate the releasing linkage a distance sufficient to move the sear bars of Figures 2 from between the bomb-hook rollers, a detent stop sleeve 34 is reciprocatably mounted immediately inwardly of the supporting tube 12 with its upper end disposed between the tubular member 25 and the skirt 31. Sleeve 34 bears threads 35 on its exterior periphery near its upper end which are adapted to reach on threads 13 on the upper interior or tubular support 12. The lower portion of sleeve 34 is sealed to the tube 12 by the O-ring seal 14 and the upper end of this sleeve bears an inwardly concave collar or bell 37, the inwardly flanged upper end 38 of which is formed with a series of notches 39 which define a series of lugs 40 therebetween. At one end of a diameter a key 41 is radially slidably mountable in vertically extending apertures in the bell for inward movement into the corresponding ones of the notches 31.

In assembling the detent bearing sleeve and the detent stop bearing sleeve, the two sleeves are endwise fitted together with the lugs 33 vertically aligned with the notches 39 whereupon the detent sleeve is lowered and turned in order to register lugs 33 under lugs 40. The keys are then inserted and the outer sleeve 25 covers the key apertures and maintains the keys in place.

An elongate cylinder 42, terminating downwardly in a radially bifurcated foot member 43, screw-threadedly attached thereto, is reciprocatably mounted intermediate the tubular member 15 and the sleeve 34. Cylinder 42 threadedly bears on the interior of its upper end, an annular abutment member 44. The spring 20 thus is abutted at its upper end by the abutment member 44 and at its lower end by the adjacent end of member 16. A port 45 is provided in the cylinder 42 intermediate its ends and an annular guide and spacer 46 is mounted on the inner periphery of the sleeve 34.

The chambers defined by the aforedescribed construction and arrangement of tubular members are traversed at their tops by a breech block assembly 47. This assembly includes an annular housing and breech block 48 in which vertically movable, spring-urged locking pins 49 are mounted at diametrically opposite points. A firing plug 50 is mounted concentrically of the housing 48 and contains a firing electrode 51 terminating downwardly in the chamber 21. The plug 50 is exteriorly threaded as at 52 to engage the breech block, which is vertically interposed between the plug and the upper end of the detent bearing sleeve. The lower periphery of the breech block is in threaded engagement, as at 53, with the threaded upper portion of the detent bearing-sleeve 28.

A two-armed handle 54 is attached by its annular central portion to the upper end of the sleeve 28. When the right arm is rotated out of the plane of the paper, the sleeve 28 is reached downwardly on the threads 30 at the upper end of the sleeve 25. The rotation of the sleeve 28 is transmitted through the keys 19 to tube 15 and through lugs 33 and the keys 41 to the detent stop cylinder 34 which is hence reached downwardly on the threads 13. The downward movement of the cylinder 15 carries the foot carrying cylinder 42 with it. The explosion chamber is hence bodily translated downwardly as a unit. Thus, when it becomes necessary to urge the foot into the proper contact with the upper surface of a bomb of a diameter smaller than the previously straddled bomb, this can be done without varying the volume of the explosion chamber.

The bomb release assembly includes a supporting ring 55 loosely encircling sleeve 28 and resting on annular shoulder 26. Extending loosely downwardly through clearance bores in diametrically opposite points of the ring are connecting rods 56 normally spring urged downwardly. At its lower terminus, each rod is pivotally connected to the inner end of a cranked lever group 57 arranged in each arm of member 10. The lever group may consist either of a bell-crank, or of two separate levers, fixedly mounted on a shaft 58 in angular relationship. A pin 59 extends laterally from the lower end of the lower arm of each of the lever groups 57. A link 60 is pivotally attached at the one end to each of the pins 59 in each arm of the tube 10, and at the other end, each link is pivotally attached to the upper end of a lever 61 which is bifurcated at its lower outer end. Levers 61 are pivotally mounted on brackets 62 fixed to and extending upright from the lower inside periphery of the tubular member 10.

A helically coiled spring 63 is vertically disposed near each of the outer ends of the tubular member 10 between the lower bifurcated end of each of the levers 61 and the upper side of the casing. A retainer cap 64 is disposed at the upper end of each spring and is mounted at its upper side in an adjacent aperture in the tubular member 10, while a seat-washer 65 is disposed coaxially of the lower end of each spring between said end and the upper face of the lever 61. A spacer tube 66 extends coaxially of each spring and through apertures in the upper and lower faces of the bomb-carrying tube 10, being fixed to the sub-adjacent seat to move vertically with the same and with the spring under the action of the corresponding lever 61. The lower end of each spacer tube bears a sear bar 67 extending laterally from the lower end of the spacer tube 66.

The sear bars and the lower end of the spacer tube are enclosed by a hollow rectangular housing 68 attached at its upper end to the underside of the tubular member 10 and having an opening 69 at its lower end. Substantially medially of the vertical dimensions of the casing, a stop is provided and is here shown as comprising a transversely extending rod 70 disposed in the downward path of the sear bar to limit downward movement thereof.

Near the open end of the housing 68, a pair of shafts 71 extends in spaced parallelism between the front and rear faces thereof. On each shaft, an F-shaped hook 72 is rotatably mounted at a point lying on the stem of the F between the bars thereof, the F's lying in inverted attitude with the bars confronting. The upper end of each hook bears a roller 73 having a portion of its periphery protruding into the path of the vertically reciprocatable sear bar and adapted to be engaged thereby. A transversely disposed helically coiled spring 74 having laterally extending ends is mounted on each of two rods 75 extending transversely of the housing adjacent to the upper end of each hook with the lower free end 76 of each spring bearing against the adjacent roller and the upper free end 77 thereof bearing against the underside of tubular member 10.

A blast shield 78 may, if desired, be provided to encase the foot and the lower end of the foot tubes, whereby to protect adjacent portions of the airplane from the heat and corrosive effects of the explosive gases.

The invention also provides manually operable bomb releasing means employable to operate the release linkages and open the hooks so that the bomb can be loaded in the rack. These means are also utilizable in the event that the afore-described automatic releasing means become inoperative. Such linkages conventionally would operate out of unison, the right hand linkage operating before the left hand one, because of manufacturing tolerances, or, in certain designs, because of the pilot's pull being transmitted first to the right hand one from the rightwardly angling operating handle and leftwardly extending lanyard attached thereto. However, the present invention obviates this difficulty and establishes synchronous operation of the release linkages. As shown in Figures 3 and 4, the mechanism for achieving this result comprises a knurled edge disk 79 rotatably fixed by means of a bolt and nut arrangement in the wall of the medial portion of tubular member 10 at the lower end of the bomb ejecting assembly. The disk is adapted to be rotated past a clamp 80 provided to lightly engage the disk to hold same and its connected linkage without slippage. The disk is provided, below center, with bossed-in aperture 81, the boss protruding outwardly from its face. A hollow annularly flanged stud-like member 82, inwardly threaded in its hollow portion, is fitted into the aperture 81 from its rear face. A handle 83 is rigidly attached to the outer end of the boss by means of a set screw 84 passing therethrough and into threaded engagement with the threads in the stud-like member. To the rear face of the annular flange of member 82 is attached a bellcrank 85, bearing pins 86 at the opposite ends thereof. The axis of the bellcrank thus lies below the center of the disk. Each of the linkage shafts 58 bears, longitudinally offset from the lever arrangement 57, another crank 87 angularly disposed relative to the arms of the bellcrank 57. The lower end of crank 87 bears a pin 88. A link 89 extends between the pins 86 and 88. The link 89 is slotted at its outer end. A helically coiled spring 90 is operatively interposed between the outer end of each link 89 and a bracket 90a fixed to the inside of tubular member 10. Spring 90 is normally effective to urge the two sets of linkage outwardly apart, thus to assist in maintaining the handle 83 in proper position.

In bombing up the dive bomber, the bomb rack portion 10, of the device is first prepared for receiving a bomb. To this end, the two pairs of hooks, normally maintained closed, as shown in full lines in Figure 2, are opened by the pilot's pulling leftward a lanyard, not shown, but attached to handle 83, thus rotating the handle counterclockwise. When the handle is so rotated, the links 89 are retracted towards the vertical center line of the device against the tension of the helical springs 90, thereby rotating levers 61 clockwise upwardly and elevating the sear bars 67. Thereby, the spring biased F hooks 72 are freed of restraining forces and are urged outwardly apart by the springs 74. The bomb is then mounted between the open hooks in longitudinal parallelism with the tubular member 10, the bomb lugs traversing the gaps between each pair of hooks. When urged upwardly, the bomb lugs bear against the shorter arms of the F hooks and rotate the upper ends of the hooks outwardly to close the lower ends thereof underneath the bomb lugs. Thereupon, the sear bars 67 are forced downwardly by springs 63 to their place between rollers 73, thereby automatically latching the rack. The breech block assembly 47, carrying the electrical firing leads, is then removed and an engine starter cartridge is inserted and seated in the chamber, whereafter the breech block is replaced. If necessary, to adapt the device to fit a smaller bomb, the handle 54 is then turned properly to feed the foot and sway brace downwardly into contact with the bomb.

To automatically discharge the bomb, that is, to release the bomb from the rack portion of the device and substantially concurrently displace it laterally from the aircraft to a point lying outside of the propeller disk, a control switch or key in the pilot's cockpit is actuated to close the electric circuit through the igniter contacting the cartridge or other charge in the cartridge supporting chamber. The charge explodes upwardly as well as downwardly, effecting an upward reactive movement of sleeve 15 which carries sleeve 24—25 and 28 upwardly with it. As aforestated, the lower end of sleeve 25 carries the upper terminus of each of the bomb releasing linkages that include the rods 56. Upward movement of these rods eventuates in the upward movement of the sear bars 67 to the position shown in dotted lines in Figure 2, freeing the bomb hooks and releasing the bomb.

Substantially immediately, the downward force of the explosion downwardly drives the cylinder 42, carrying foot 43. At the same time, the explosive gases pass through an aperture 92 in the piston head and act forcefully in the depression formed in the upper surfaces of the foot. The resultant outward impetus imparted to the foot tube 42 effectuates positive discharge of the bomb laterally far enough beyond the propeller disk to enable the bomb to widely clear same when it commences its descent from the lateral discharge path.

When the tube 42 has moved downwardly sufficiently to displace the port 45 located in the medial portion thereof, to a point opposite the lower face of the piston, a passageway 93 leading to atmosphere through a port 94 in the detent stop bearing cylinder is opened. Thus, the excess explosion gases and the relatively small afterburning powder granules are exhausted to atmosphere and the explosion chamber is relieved of all pressure tending to prevent return of the cylinders to their proper initial positions, that is, their return to battery.

In the event that the automatic bomb releasing construction fails to function because of some damage sustained thereby, as from projectile hits received in fighting the airplane, or because of failure of the firing charge, etc., the airplane is put into a shallower dive in order to raise the propeller disk above the gravitational path of the falling bomb. Thereupon the pilot actuates the lanyard, extending from the upper end of handle 83 to a point alongside the pilot's seat. The links 89 are thereby synchronously actuated inwardly towards the vertical center line of the device, as aforementioned, resulting in releasing the bomb lugs from the F hooks. The bomb then falls outwardly and downwardly in a path that clears the propeller disk.

Because the bomb-releasing linkage is rigid in tension, the two pairs of bomb hooks can be opened only in unison, assuring simultaneous opening of the lug hooks and proper release of the bomb. Since these linkages are flexible in compression, however, the pairs of bomb hooks can be closed independently of each other, permitting loading one end of the bomb into the rack before the other.

I claim:

1. An aircraft missile-launching device, including: a missile suspending member; means on said member for releasably supporting a missile; a launching member; means slidably carried by said launching member to release said supporting means; an ejector element slidably carried by said launching member and normally in contact with said missile; and means operative to simultaneously apply actuating forces to said releasing means and to said ejector element.

2. An aircraft missile-launching device, including: a missile suspending member; means on said member for releasably supporting a missile; a tubular launching member mounted on said suspending member; a first tubular member having an open end and a closed end slidably carried by said launching member and adapted to release said supporting means; a second tubular member having an open end and a closed end, said closed end normally being in contact with said missile; said last two members cooperating to provide an expandible fluid chamber; an explodible source of pressure within said chamber; and means to trigger said source to suddenly produce fluid pressure to substantially simultaneously move said first tubular member to release said supporting means and said second tubular member to eject said missile.

3. An aircraft missile-launching device, including: a member mounted in the aircraft and adapted to suspend a missile therefrom; closable and openable detent means protruding from said member to releasably support the missile; a missile-launching member mounted on the first said member and extending upwardly therefrom; reciprocatable means slidably carried concentrically of said launching member and adapted to open said detents; a reciprocatable missile ejector element slidably carried by said launching member concentrically of the first said reciprocatable member and having its lower end normally in contact with said missile; and means carried by one of said reciprocatable members and operative to simultaneously apply oppositely directed actuating forces to said detent operating means and said ejector element.

4. An aircraft missile-launching device, including: an elongate member releasably suspending said missile on the aircraft; a pair of concentrically arranged cylinders open at their opposite ends, vertically reciprocatably mounted in overlapping relationship on said suspending member; means operatively connecting said releasable bomb suspending members with the upper portion of the inner cylinder; a formation on the lower end of the outer cylinder contacting said cylinder with said missile; and a triggerable source of potential energy disposed in the upper inside end of said inner cylinder and adapted to be released so as to suddenly force said cylinders axially oppositely; whereby to urge the inner cylinder upwardly and effect release of said missile from said releasable suspending members and to immediately thereafter urge the outer cylinder downwardly and effect ejection of the missile from the craft.

5. An aircraft missile-launching device, including: a member incorporating means releasably suspending said missile on the craft; a double-walled, closed top, release-actuating cylinder vertically reciprocatably mounted on said suspending member, said double-walled cylinder being operatively connected at its lower outer edge to said releasable suspending means and adapted to react upwardly to fluid pressure; a missile-thrusting member vertically reciprocatably mounted concentrically intermediate the double wall of said actuating member and adapted to, move downwardly under fluid-pressure; respective detent means disposed to limit the upward movement of said actuating member and to limit the downward movement of said thrusting member; and a triggerable source of potential energy disposed in the upper inside end of said actuating member and so organized and oriented as to suddenly apply energy to said thrusting member upon triggering; whereby to react said actuating member upwardly and release said missile from the suspending means and immediately thereafter to suddenly downwardly urge said thrusting member, thereby to eject the missile beyond the propeller disk of the craft.

6. An aircraft missile-launching device, including: a member incorporating means releasably suspending said missile on the craft; a missile release actuating cylinder reciprocatably mounted rectangularly on said suspending member and operatively connected at its lower end to said releasable suspension means; a missile-thrusting cylinder vertically reciprocatably mounted concentrically inwardly of said actuating member and closed at its lower end; a vertically reciprocatable force transmitting member open at its lower end and mounted concentrically inwardly of said thrusting member and connected at its upper end to said release-actuating member; cooperative detent members disposed on said actuating member and said thrusting member to limit the upward movement of said actuating member and said force transmitting member; cooperative detent members disposed on said thrusting member and said force transmitting member and adapted to limit the downward movement of said thrusting member; and a triggerable source of potential energy so disposed in the upper inside end of said actuating member and so oriented and organized as to suddenly apply energy to said thrusting member; whereby to react said actuating member upwardly and effect release of said missile and immediately thereafter to suddenly directly force said thrusting member downwardly and eject the missile beyond the propeller disk of the craft.

7. In combination in an aircraft, a missile suspending member mounted therein and including releasable missile engaging detents movably mounted in longitudinally spaced relationship on its underside; a vertically reciprocatable detents-actuating cylinder supported by said suspending member; connections linking said actuating member and said detents adapted to move said detents into active and inactive positions; a vertically reciprocatable cylinder, having an imperforate transverse lower surface, supported by said suspending member concentrically inwardly of the first said reciprocatable cylinder and contacting said missile; a vertically reciprocatable cylinder having a perforate transverse lower surface and mounted concentrically inwardly of the second said reciprocatable cylinder and connected at its upper end to said actuating cylinder; detent means projecting outwardly from the periphery of the second-said reciprocatable member intermediate its ends; a corresponding detent stop projecting inwardly from the interior surface of said actuating member and adapted to limit the upward movement of said actuating member; and a suddenly releasable potential energy source disposed in the upper end of the third said reciprocatable member and adapted to apply said energy to said imperforate transverse surface; whereby to effect reactive upward movement of the third said reciprocatable member so as to release said missile from said detents and to forcefully urge said missile contacting member downwardly so as to effect outward ejection of said missile.

8. An aircraft missile-launching device, including: a missile suspending member mounted in the craft and having releasable missile-engaging detents mounted in longitudinally spaced relationship on its underside and protruding downwardly from the craft; operating linkages for the first said mechanisms disposed longitudinally of said suspending member with each linkage connected at its outer end to the adjacent missile engaging-mechanism, the inner ends of said linkages lying mutually adjacent intermediate the ends of said suspending member; an actuating cylinder for said operating mechanisms vertically reciprocatably mounted on said suspending member and having its lower end connected to said inner terminuses; a vertically reciprocatable cylinder downwardly contacting the missile and mounted concentrically inwardly of said actuating member with a fluid impaction surface extending transversely above its missile contacting portion; a hollow, open head piston cylinder reciprocatably mounted vertically centrally of the device and having its upper end operatively connected to the upper end of the first said reciprocatable member; detent means projecting outwardly from the periphery of the second said reciprocatable member intermediate its ends; corresponding detent stop means projecting inwardly from the interior surface of said actuating cylinder and adapted to limit the upward movement of said actuating cylinder; and a suddently releasable potential energy source mounted in the upper end of said piston and adapted to release said energy downwardly through said piston onto said fluid impaction surface; whereby to reactively urge said piston upwardly to effect release of said missile and to directly thrust said missile contacting member downwardly so as to effect outward ejection of the released missile.

9. A device for launching a missile from aircraft, including: a missile suspending member mounted in longitudinally extending attitude inside the craft with only releasable missile engaging detents protruding therefrom into the airstream; operating linkages for said detents disposed longitudinally of said suspension member with the outer terminus of each linkage operatively connected to the adjacent ones of said detents and the inner terminuses thereof disposed mutually adjacent each other intermediate the ends of said suspending member; a reciprocatable cylinder extending upwardly from the upper side of said suspending member intermediate its ends and attached at its lower end to the inner termini of said linkages; a hollow cylindrical member vertically reciprocatably mounted concentrically inwardly of the first said cylindrical member and having a closed lower end protruding downwardly and laterally from the craft as a missile contacting formation; a hollow piston cylinder, having an open lower end and a closed upper end, vertically reciprocatably mounted concentrically inwardly of the second said cylinder with its open end downwardly directed and its upper end operatively connected to the upper end of the first said cylindrical member; detent means projecting outwardly from the periphery of the second said reciprocatable member intermediate its ends; corresponding detent stop means projecting inwardly from the interior surface of said actuating member and adapted to limit the upward movement of said actuating member; instantaneous fluid-pressure generating means so mounted at the upper end of the third cylindrical member as to direct fluid pressure downwardly onto the closed end of the second-said cylindrical member; and means for triggering off said pressure generating means; whereby to effect reactive upward movement of said piston member, thereby to release said missile, and to substantially immediately effect sudden downward movement of the second said cylindrical member, thereby to outwardly eject the released missile.

10. A device for launching a missile from an aircraft, including: a hollow elongate member bearing longitudinally spaced sets of releasable missile engaging detents on its lower side and mounted in longitudinally extending attitude inside the craft with said engaging detents protruding therefrom; detent-actuating linkages longitudinally disposed inside said elongate member with the outer terminus of each linkage operatively connected to the adjacent set of missile engaging detents and the inner termini of said linkages lying adjacent each other intermediate the ends of said elongate member; a vertically reciprocatable hollow cylindrical member extending upwardly from the upper portion of the first said member intermediate its ends and annularly connecting said inner terminuses at its lower end; a hollow cylindrical member closed at its lower end and vertically reciprocatably disposed concentrically inwardly of the first said member and terminating downwardly in a missile-contacting portion; a hollow cylindrical piston vertically reciprocatably mounted concentrically inwardly of the second said cylindrical member with its head open and downwardly directed and its upper end closed and operatively connected to the upper end of the first said cylindrical member; detent means projecting outwardly from the periphery of the second-said reciprocatable member intermediate its ends; corresponding detent-stop means projecting inwardly from the interior surface of said actuating member and adapted to limit the upward movement of said actuating member; an explodable charge mounted concentrically of the upper end of the third said cylindrical member to fire mainly downwardly into and through the third said cylindrical member and onto the second-said cylindrical member; and ports disposed in the third said cylindrical member and in said detent carrying member and adapted to register to relieve the cylinders of explosive gases for return to their original positions; whereby to effect reactive movement of the third said cylindrical member upwardly by the downward force of said explosion, thereby to release said missile engaging members from the missile, and substantially immediately effect direct downward thrust of the second said cylindrical member, thereby to forcibly outwardly eject the released missile at right angles to the longitudinal axis of the craft.

11. In an aircraft, a combined gravitationally responsive bomb rack and ballistic bomb projector, including: a missile suspending member adapted to be mounted in the craft and including releasable missile engaging detents movably mounted in longitudinally spaced relationship on its underside; a vertically reciprocatable detents-actuating member supported by said suspending member; connections linking said actuating member and said detents adapted to transmit said reciprocating motion to said detents and move same into active and inactive positions; a vertically reciprocatable member, having an imperforate transverse lower surface, supported by said suspending member concentrically inwardly of the first said reciprocatable member and contacting said missile; a vertically reciprocatable member having a perforate transverse lower surface and a closed upper end and mounted concentrically inwardly of the second said reciprocatable member and connected at its upper end to said actuating member; detent-means projecting outwardly from the periphery of the second-said reciprocatable member intermediate its ends; corresponding detent-stop means projecting inwardly from the interior surface of said actuating member and adapted to limit the upward movement of said actuating member; and a suddenly releasable potential energy source disposed in the upper end of the third said reciprocatable member and adapted to apply said energy to said imperforate transverse surface; a manually operable lever rotatably mounted on the side of said suspending member adjacent the lower end of said actuating member; and a differential connection between the lower end of said lever and the inner portion of each of said detent actuating linkages; whereby to enable automatic release and ballistic projection of said missile from the craft and manual release and gravitational discharge thereof from the craft in the event of failure of said automatic means.

12. In a bomb carrying and ejecting device of the class described, and including a longitudinal bomb suspending member carrying bomb release linkages extending from its center longitudinally to the bomb suspending means; a vertically reciprocatable release linkage actuating cylinder vertically mounted therein and slidingly connected at its lower end to the upper end of said release linkages; a vertically reciprocatable cylindrical member having an imperforate transverse lower surface and disposed concentrically inwardly of the first said cylinder and terminating downwardly in a bomb contactor formation; a vertically reciprocatable cylindrical member having a perforate transverse lower surface and mounted concentrically inwardly of the second said cylindrical member and centrally carrying an explosive charge at its upper end and connected at said end to said actuator cylinder, whereby the last two mentioned cylinders establish an upwardly and downwardly expandible explosive chamber vertically centrally disposed in the device; a screw-threaded abutment for said actuator cylinder disposed adjacent the lower end of same; and a radially extending manually rotatable handle attached to the periphery of said actuator and adapted to be rotated to bodily displace said cylinder and said chamber downwardly so as to maintain the chamber-volume constant and retain said linkage anchorage position undisturbed while forcing said bomb-contactor formation into contact with a bomb lying below the original extended position of the second said cylinder.

GEORGE A. BRONSON.

REFERENCES CITED

The following references are of record in the file of this patent:

UNITED STATES PATENTS

| Number | Name | Date |
| --- | --- | --- |
| 2,337,647 | Caulkins | Dec. 28, 1943 |

FOREIGN PATENTS

| Number | Country | Date |
| --- | --- | --- |
| 64,663 | Austria | Apr. 25, 1914 |
| 298,867 | Germany | Nov. 2, 1920 |